United States Patent [19]

Boettger et al.

[11] 3,853,198
[45] Dec. 10, 1974

[54] CENTRAL HYDRAULIC SYSTEM

[75] Inventors: Harold E. Boettger, Pontiac; Albert R. Tilford, Sterling Heights, both of Mich.

[73] Assignee: General Motors Corporation, Detroit, Mich.

[22] Filed: May 10, 1973

[21] Appl. No.: 358,947

[52] U.S. Cl. ............... 180/41, 280/124 F, 280/6 R
[51] Int. Cl. .......................................... B60g 17/04
[58] Field of Search .......... 180/41, 79.2; 280/124 F, 280/DIG. 1, 6 R

[56] References Cited
UNITED STATES PATENTS

2,862,725  12/1958  Jackson ........................... 280/124 F
2,888,272  5/1959  Fletcher ......................... 280/124 F

*Primary Examiner*—Philip Goodman
*Attorney, Agent, or Firm*—A. M. Heiter

[57] ABSTRACT

A central hydraulic system having a pump and a regulator valve source providing a substantially constant flow of fluid limited to a maximum pressure value and returning overage to the sump for supplying the brake, leveler, steering and transmission subsystems of a vehicle. The pump supplies an open center power brake subsystem which transmits sufficient flow and pressure during normal braking to operate the other downstream subsystems. Flow from the brake is divided by a flow limiting divider valve into a low flow supply providing leveling subsystem requirements with overage for the downstream steering and transmission subsystems and a high flow fluid supply always providing the steering and transmission subsystems requirements, each having the pressure required by the supplied subsystems. The high flow supply meets the open center controlled steering unit requirements for straight drive, high flow and minimum pressure and for steering, reduced flow and increased pressure with increasing load up to maximum pressure limited by a bypass valve and the transmission requirements, variable flow and constant pressure. The low flow supply is connected to provide the vehicle leveling subsystem requirements, low flow in a pressure range from an intermediate pressure up to a high overload pressure, for fill operation to increase the pressure to support increased load. On overload a relief valve opens and throttles flow from the low flow supply to the high flow supply to reduce the pressure of the low flow supply to an intermediate pressure slightly above the normal low downstream pressure requirements of the steering system for straight steering and the transmission and to the downstream pressure without throttling if it is higher than the intermediate pressure due to a steering pressure increase. The leveler control valve in a null or steady state position and exhaust position connects the low flow supply to supplement the high flow supply to the downstream subsystems. In a modification the leveler control valve in the null and exhaust positions by-passes the flow divider valve providing full flow to the downstream subsystems and the overload relief valve is connected to sump. The steering subsystem has a bypass so sufficient flow and pressure is delivered to the downstream transmission subsystem.

18 Claims, 3 Drawing Figures

PATENTED DEC 10 1974 3,853,198

CENTRAL HYDRAULIC SYSTEM

RELATED APPLICATION

This application relates to the Albert R. Tilford, Harold E. Boettger and Ming-Chih Yew, application Ser. No. 211,365 filed Dec. 23, 1971 entitled "Vacuum Servo Vehicle Leveling System," now U.S. Pat. No. 3,720,424.

BACKGROUND OF THE INVENTION

This invention relates to central hydraulic systems and particularly a fluid supply system for operating a plurality of actuator subsystems.

The regulated pump source providing a substantially constant volume rate of flow with increasing pump speed, preferably a decreasing rate of flow at higher speeds, for a power steering gear is known in the P. B. Zeigler et al. U.S. Pat. No. 3,207,077 granted Sept. 21, 1965 incorporated herein by reference to disclose such source.

The source is connected to an open center hydraulic power brake known in U.S. Pat. No. 3,628,331, Ronald L. Shellhause patented Dec. 21, 1971, incorporated herein by reference, operative in the brake off position with minimal pressure drop and with increased brake application increased brake apply pressure both with full through flow.

The open center power steering gear system having a fluid motor and a control valve operative in the straight ahead or centered position to supply low pressure to the fluid motor and provide high volume through flow and with turning increasing restriction to increase the pressure to the fluid motor to meet load up to a high pressure and having a bypass valve limiting flow restriction by the steering gear to insure sufficient flow and pressure for operation of a downstream hydraulic power operated unit is known as shown in the Lee M. Brewer et al. U.S. Pat. No. 3,590,689 patented July 6, 1971 and the P. B. Zeigler et al. U.S. Pat. No. 3,022,772 granted Feb. 27, 1962 referenced therein for the steering gear structure which are incorporated herein by reference to show the power steering subassembly.

The power steering gear and bypass valve shown in the William R. Frei application Ser. No. 253,782 filed May 16, 1972 may also be used and is incorporated by reference.

SUMMARY OF THE INVENTION

The central hydraulic system has a source supplying in series a brake subsystem and a divider valve which supplies in parallel a leveling subsystem and downstream series connected steering and transmission subsystems. The fluid pressure source provides a substantially constant fuel flow at the required pressure up to a maximum pressure to an open center power brake which in the brake off position provides full through flow with minimal pressure drop and with increased brake application restricts through flow and increased brake apply pressure. The brake through flow is connected to a divider valve which divides the flow received from the brake in a predetermined proportion into a low flow supply and a high flow supply throughout the range of operating pressures. A leveling subsystem has controls and a motor requiring a high pressure range and low flow to supply a closed chamber motor. A steering subsystem has controls and a motor normally requiring minimum to low pressure and high flow and increased pressure, up to maximum steering pressure and reduced flow. The transmission subsystem requires a constant low pressure and varying flow. The high flow supply is always connected to the steering subsystem which may be connected in series to the transmission subsystem. The control valving of the leveling subsystem has a fill position for supporting an increased load at the same level connecting the low flow supply to the leveling motor and a null or steady state position to hold the level by holding the pressure in the motor and an exhaust position to reduce the level by reducing the pressure in the motor. In the null and exhaust position the valve blocks the low flow apply to the leveling motor and connects the low flow supply, then an overage flow, to the high flow supply. When the low flow supply is connected to fill the leveling motor the pressure in the low flow supply and motor increases to support increasing load. The highest pressure supplied to the leveling motor is retained by a check valve until the valve moves to exhaust position. A relief valve responsive to a pressure in the low flow supply exceeding the high pressure range, an overload pressure, relieves only the pressure in the low flow supply and thereafter maintains the pressure of the low flow supply at a low value less than the leveling subsystem pressure range and above the minimum pressure of the high flow supply for the downstream subsystems, the steering subsystem functioning for straight drive and low load steering and the transmission subsystem and connects and feeds the full low flow supply to the high flow supply. When steering pressure exceeds this low relief valve pressure both the low flow supply and high flow supply will have steering pressure plus the pressure required by any additional downstream subsystem such as the transmission. The subsystem pressure in the high flow passage is relieved by a steering subsystem bypass valve to insure flow to the transmission The source also has a relief valve.

The regulator valve controlled pump source provides a source of fluid pressure having a substantially constant volume rate of flow with increasing pump speed, preferably decreasing flow at high pump speeds, and a limited maximum pressure. The vehicle leveling actuator subsystem for maintaining constant vehicle level with varying load has controls and fluid motors requiring a low rate of flow and a high leveling pressure range from a lower pressure for minimum load to a high pressure for maximum load during the filling mode of the automatic leveling controls. The automatic leveling controls have a fill mode to supply fluid through a check valve to the leveling motors to support the load at the proper height, a null or steady state mode in which the check valve maintains the established proper height by retaining the fluid in the leveling motors and an exhaust mode disabling the check valve to reduce pressure in the motors. In the null and exhaust modes the low flow supply is not required by the leveling subsystem and is connected to supplement the high flow supply. At times, due to overload, the leveling subsystem would call for, or require higher pressure, if the constant vehicle level is to be maintained but overload leveling is aborted so maximum leveling pressure is less than maximum source pressure. Leveling is aborted by the relief valve which is opened only by overload pressure in the low flow supply and regulates low flow supply pressure at an intermediate value and throttles flow to the high flow supply when it has a lower pressure meeting downstream pressure requirements during low steering load operation. If the downstream subsystem pressure requirement in the high flow passage is higher than the intermediate pressure, as during high load steering, the low flow supply pressure similarly increases so the low flow supply continues to supplement the high flow supply. During such low or high pressure operation of the downstream subsystems, removal of the overload will cause the leveling control to return to the null or exhaust position and the relief valve will close conditioning the controls for automatic leveling. The vehicle steering actuator subsystem, an open center type, for normal low load rolling steering requires a high rate of fluid flow at a low pressure and under changing load steering condition requires a higher pressure for higher load steering. The maximum steering pressure and flow restriction, such as would occur when the operator calls for further turning while the steering gear is against its mechanical limit stop, is limited to proper values for steering and to insure sufficient flow and pressure for the downstream subsystem, the transmission.

The fluid flow provided by the source through the upstream subsystem is centrally fed to a movable element of a flow divider valve having opposed restrictions and control ports to divide the source flow from the brake into two parallel supplies, a low volume flow supply and a high volume flow rate supply to meet subsystem requirements and at the total pressure required by the series connected brake, steering and transmission subsystems and the higher pressure of the parallel connected low and high flow supplies plus the brake pressure.

The source pressure is only increased during the actual time period and to meet increased subsystem pressure requirements. The leveling subsystem on partial load and full load maintains the high pressure and permits reduction of source pressure to a minimum or low value sufficient for employing this pressure and operation of the brake, steering and transmission subsystem.

In a modification the leveling valve in the null and exhaust positions bypasses the divider valve to provide full flow to the downstream subsystems and the overload relief valve exhausts to sump to reduce pump pressure requirements.

Further features and advantages of the present invention will be apparent from the following description of a preferred embodiment of the invention shown in the drawings.

Figure 1:
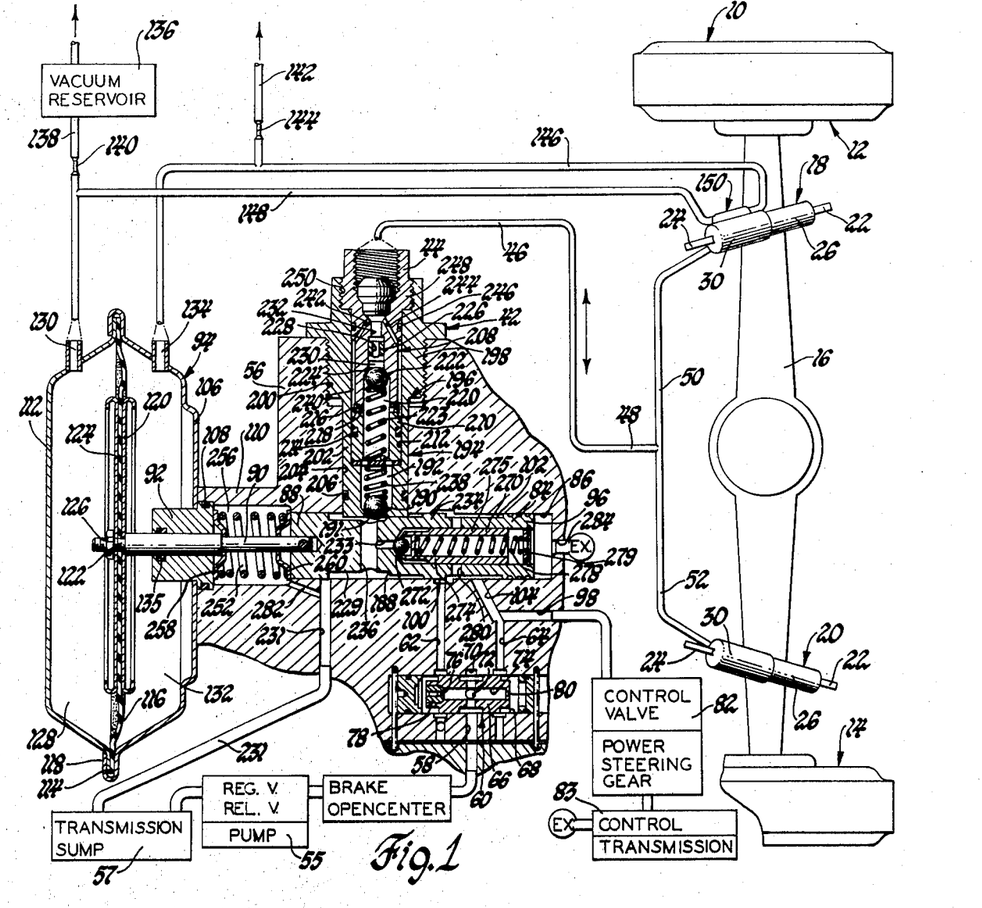
FIG. 1 is a diagrammatic view of a central hydraulic system having a vehicle leveling subsystem and a steering subsystem.

FIG. 1 shows a central hydraulic system having a vehicle braking, leveling, steering and transmission subsystems and includes the vehicle rear suspension 10 having a pair of undamped ground engaging wheel assemblies 12, 14 each supported on an end of axial housing 16.

The leveling subsystem further includes a pair of spaced apart vehicle leveler units 18, 20. Each of the leveler units has a bottom mount 22 connected to the axial housing 16 and an upper mount 24 which is adapted to be connected to a portion of the sprung chassis of a vehicle (not shown). Each of the leveler units 18, 20 function to produce a variable resultant uplifting force which will supplement the load carrying capacity of a pair of primary spring components (not shown) which are present in a vehicle suspension system to maintain a chassis in sprung relationship with respect to the unsprung mass portions as for example those portions represented by the axial housing 16 along with the wheels 12, 14.

Each of the leveler units 18, 20 are representatively shown as high pressure vehicle shock absorbers. Any leveler unit having a variable volume chamber defined between two relatively movable members to produce vehicle leveling would be suitable. Each leveler unit includes an outer reservoir cylinder 26 connected at the bottom end thereof to the bottom mount 22. A piston rod 28 extends from the reservoir cylinder 26. It is connected to an open ended dust shield member 30 in telescoping relationship to cylinder 26. Shield 30 has its upper end connected to the upper mount 24.

Normal road movements of the vehicle on the suspension springs thereof will cause relative movement between the body and axle and the leveler units 18, 20 extend and retract whereby the piston rod 28 will move into and out of the reservoir cylinder 26. The piston rod 28 is connected to a valved piston 32, FIG. 2, slidably supported for reciprocation within an oil filled pressure cylinder 34. The pressure cylinder 34 is located in radially inwardly spaced relationship to the reservoir cylinder 26. A flexible tubular bladder 36 is located between the reservoir cylinder 26 and the pressure cylinder 34 and is sealed to define a gas space 38 between it and the pressure cylinder 34 which is selectively pressurized during leveler unit operation. On the outside of the bladder 36 between it and the reservoir cylinder 26 is formed an oil reservoir chamber 40 which is in communication with the oil filled pressure cylinder 34. When oil is pumped into the leveler units 18, 20 the volume of oil in the chamber 40 will increase thereby to cause the bladder 36 to flex inwardly toward the pressure cylinder 34. This increases the pressure in the gas space 38.

Figure 2:
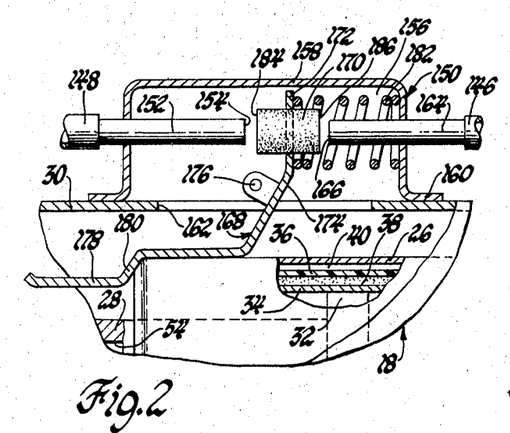
FIG. 2 is an enlarged, fragmentary view partially in section and partially in elevation of an undamped height sensor valve in the system of FIG. 1.

The piston rod 28 is connected to the piston 32 to define a differential area thereacross. The increase in pressure in the gas space 38 will produce a resultant increase in pressure within the pressure cylinder 34. It acts on the area of the piston rod 28 to produce a variable resultant force between the end mounts 22, 24 to supplement the load carrying capacity of the primary springs of the suspension.

Oil flow to and from the variable volume oil filled reservoir chamber 40 is under the control of a height control valve assembly 42. The height control valve assembly 42 more particularly includes a fitting 44 thereon connected to a conduit 46 for supplying oil through a tee connection 48 and branch lines 50, 52 serving as two way inlet and exhaust lines respectively to the leveler units 18, 20. Each of the lines 50, 52 are connected to an inlet fitting which is connected to an axial passage 54 through the piston rod 28 for supplying oil into the pressure cylinder 34 through base valve means (not shown) into the reservoir chamber 40.

The height control valve 42 has a housing 56 including an inlet passage 58 adapted to be connected through an upstream subsystem, a brake, to a pump 55 in an automatic hydraulic transmission of a vehicle. The pump is of the type shown in the above U.S. Pat. No. 3,207,077 incorporated herein by reference and includes flow and pressure regulating valving to provide a predetermined substantially constant volume rate of output flow i.e., 3 gpm in the operating speed range and pressure up to a maximum limited source and system pressure value i.e., 1,350 psi. It is preferred that the flow rate decrease, as system flow requirements decrease, at higher speeds as shown in this patent. The pump suction is connected to the transmission sump 57 and conventionally driven by the transmission input but may be driven directly by the engine. The pump and its flow and pressure regulator valves provide the central hydraulic system fluid source. The pump is connected to supply an open center hydraulic power brake, the upstream subsystem, which may be constructed as shown in the above U.S. Pat. No. 3,628,331 to provide in the brake off position full through flow with minimal pressure drop i.e., 10 – 15 psi and with increasing brake application increases the restriction and the brake apply pressure. The normal brake application pressure and pressure drop is an intermediate pressure i.e., 200 psi so a high pressure i.e., 1,350 psi less 200 psi or 1,150 psi with full flow is transmitted to provide a sufficient flow and pressure to operate the downstream leveling, steering and transmission subsystems during normal braking. The inlet passage 58 is connected across a flow divider 60 to a leveler unit or low flow passage 62 through which 10 percent of the flow from the inlet passage 58 passes and to an auxiliary system's or steering system or high flow passage 64 through which 90 percent of the flow from the passage 58 is directed substantially throughout the operating pressure range.

The flow divider 60 has a piston 66 slidably supported for reciprocation in bore 68 having one end in communication with the passage 62 and the other end in communication with the passage 64. Inlet passage 58 is always connected by annular opening 70 around piston valve 66, and groove opening 72 in the piston 66 to central bore 74 axially through piston 66. At one end of the bore 74 an orifice 76 is located in an insert 78 and at the opposite end thereof a second orifice 80 is located. The orifices 76, 80 have a flow area ratio, providing differential pressure on piston valve 66 and the lands on piston valve 66 restrict, but do not close, the ports of passages 62 and 64 to produce the 10 percent flow through passage 62 and the 90 percent flow through the passage 64 substantially throughout the operating pressure range to meet the low flow requirements of the leveling system and the high flow requirements of the steering and transmission subsystems.

Flow from the leveler unit passage or low flow supply 62 is under the control of a pilot spool valve 84 slidably supported for reciprocation in a housing bore 86. One end portion 88 of the spool valve 84 is connected to one end of an actuator member 90 having the opposite end thereof slidably supported within a bearing element 92 for reciprocal movement into and out of a vacuum servo actuator 94. The opposite end of the pilot valve 84 has a peripherally sealed land 96 slidably supported in the opposite end of bore 86.

As illustrated in FIG. 1, the vacuum actuator 94 is in a null or neutral position where it disconnects the passage 62 from the bore 86. Oil flows through the 90 percent flow passage or high flow supply 64 and thence through a passage 98 leading to other hydraulic components or downstream subsystems such as the power steering hydraulic subsystem 82 and transmission subsystem 83. The power steering system is as shown in the above U.S. Pat. Nos. 3,590,689 and 3,022,772 incorporated herein by reference of the open center type having for straight drive and low load running steering high flow and minimum pressure i.e., 50 – 70 psi requirements and for higher load steering increasing pressure requirements with full flow. The steering subsystem has a restriction limit valve to limit steer pressure so that sufficient pressure is available to supply the transmission subsystem 83 pressure requirements with full flow. The transmission controls have a conventional regulating transmission operating pressure, i.e., 100 psi, and connecting overage to exhaust to transmission sump 57.

When valve 84 is in its neutral position, the 10 percent flow through the passage 62 will pass through an annular groove 100 in housing 56 and a groove 102 in the outer periphery of the valve 84. Groove 102 is in communication with a passage 104 leading to the passage 98.

During level phases of operation, wherein the valve 84 is maintained in its null or neutral position, the system is controlled to produce a balanced pressure condition within the valve actuator 94. To accomplish this, the actuator 94 has a first wall portion 106 fastened at a radially innermost portion thereof to the bearing element 92. The actuator is sealed with respect to element 92 by means of an O-ring 108 interposed between the element 92 and an extension 110 on the housing 56. The actuator includes a second wall portion 112 having a peripheral flange 114 thereon held in sealing engagement with the outer periphery of a flexible diaphragm 116. The sealing engagement is obtained in the illustrated embodiment by a bent over peripheral portion 118 on the first wall portion held against the flange 114 to press it in sealing engagement with the diaphragm 116.

The diaphragm 116 includes a reinforcing disc 120 on one face through which a threaded extension 122 on the actuator member 90 extends to the opposite side of the diaphragm where it is secured against a like reinforcing disc 124 by means of a nut 126. The diaphragm 116 and wall portion 112 define a closed chamber 128 connected to a control conduit 130. An opposed chamber 132 is formed by the diaphragm 116 and the wall portion 106. It is connected by means of a conduit 134 in a fluid control circuit to be described.

The control chamber 132 is sealed with respect to the height control valve by an O-ring seal 135 supported within a groove on the inside of the bearing element 92 through which the actuator member 90 is reciprocated during system operation. The conduits 130, 134 are each connected to a source of vacuum, preferably an existing vacuum source such as the intake manifold of an internal combustion engine for powering the vehicle. The conduit 130 is connected by conduit 138 having a vacuum bleed orifice 140 therein to vacuum reservoir 136 and thence to engine vacuum. A conduit 142 with a vacuum bleed orifice 144 connects the vacuum source to the conduit 134. The fluid control circuit further includes a first air bleed line 146 which is connected to the conduit 134. Line 146, along with the vacuum bleed orifice 144, establishes the pressure within the chamber 132. A second air bleed line 148 is connected to the conduit 130 and with the vacuum bleed orifice 140 establishes the pressure level in height control chamber 128 of the actuator 94.

A height sensor assembly 150 is located on the leveler unit 18 to control the amount of air flow into the bleed lines 146, 148. More particularly, the assembly 150 includes a first tube 152 which is connected to the air bleed line 148. The tube 152 is an extension of the line 148 and it includes an open end 154 thereon located within a control chamber 156 formed by a housing member 158 with a peripheral segment 160 thereon connected to the dust shield 30 of the leveler unit 18 around an opening 162 therein. The assembly 150 further includes a second tube member 164 connected to the air bleed line 146. It forms an extension of the conduit 146 and locates an open end 166 thereon also within the control chamber 156.

The fluid control circuit to the actuator 94 is under the control of an undamped valve assembly 168. It includes a movable valve element 170 supported on the distal end 172 of a sheet metal lever 174. It is pivotally connected by a pin 176 to the housing 158. The lever 174 also includes an end portion 178 located interiorly of the dust shield 30. It has an offset portion 180 therein which is maintained in spring biased engagement with the curved outer configuration of the shock absorber reservoir cylinder 26 by means of a spring member 182 having one end thereof engaged with housing 158 and the opposite end thereof biased against the lever arm 174 so as to cause the lever arm to be biased inwardly of the dust shield 30.

When the vehicle is level, the lever 174 is maintained against the cylinder 26 so that the movable valve element 170 will have opposite ends 184, 186 thereon located in spaced relationship to the open ends 154, 166 of the air bleed tubes.

When the vehicle is unloaded, the primary suspension springs will move the chassis frame upwardly from the axial housing 16 thereby to cause the leveling units 18, 20 to extend.

At this point, the spring 182 will bias the lever 174 farther into the chamber opening 162 causing the end 184 on the movable element 170 to close against the open end 154 of the bleed tube 152 to close line 148.

When the valve 168 is so positioned, an exhaust phase of operation is initiated. During the exhaust phase, atmospheric air bleed through conduit 148 is blocked and air is withdrawn from the chamber 128 through conduit 130 across the orifice 140 and the conduit 138 to the vacuum source to reduce the pressure therein. Concurrently atmospheric air is bled from the open end 166 and the bleed line 146 into the chamber 132 to increase the pressure therein. Accordingly, the diaphragm 116 will move to the left as viewed in FIG. 1 thereby to move the vacuum actuator member 90 to the left along with the spool valve 84. At this point, a tapered surface 188 on the pilot valve or shuttle piston 84 will move against a ball check valve 190 to move it upwardly from a valve seat 191 leading to an internal bore 192 of a high pressure inlet valve assembly 194.

The high pressure inlet valve 194 is located in one end of a tubular fitting 196 which has a threaded head portion 198 threadably received in an internally threaded bore 200 formed in the housing 56. It further includes a tubular extension 202 thereon slidably fit in a housing bore 204. The extension 202 is sealed with respect to the bore 204 by an annular O-ring 206 around the end thereof.

The high pressure valve 194 is opened by the pilot valve 84 and is in series communication with a low pressure exhaust valve assembly 208. Assembly 208 includes a tubular extension 210 slidably supported in a bore 212 of the fitting 196. It is sealed with respect to the bore at one end thereof by an O-ring seal 214. An annular rubber O-ring valve member 216 is seated in an external peripheral groove in extension 210 to define a high pressure check valve.

The high pressure check valve is communicated by a plurality of circumferentially spaced openings 218 through tubular extension 210 with an internal bore 220 through the low pressure exhaust valve assembly 208. Within this bore is located a low pressure spring 223 biased against one side of a ball check element 222 maintained in sealed relationship with an annular seat 224. Above the seat 224 is located a flow attenuating and controlling insert 226 having therein an axial passage 228 extending from the upper and upstream end to the transverse passage 230 therein. The insert 228 is aligned in parallel with an exhaust port 232 formed in the fitting 44 to the conduit 46 leading to leveler units 18, 20.

Thus, in the exhaust phase of operation, high pressure oil within the leveler reservoir 40 will flow through the branch lines 50, 52 and the conduit 46 and fitting 44 against the flow attenuating insert 226. The pressure of the oil will cause the insert 226 to move downwardly as viewed in FIG. 1 against the ball check element 222 to move it from its seat. At the same time oil will flow through passages 228 and 230 and evenly around the side of the ball 222 to prevent impacting of the ball 222 against its seat during the exhaust phase of operation thereby to reduce the noise of operation.

The valve 222 is thereby maintained against the light force of the spring 223 and exhaust oil flow will occur through the internal bore 220 around the open valve 190 thence to the hydraulic sump through a groove 229 in valve 84 and to low pressure opening 231 in housing 56.

As the high pressure oil flows from the leveling units 18, 20 during the exhaust phase, there will be a lesser resultant uplifting force therefrom. As a result the more lightly loaded chassis of the vehicle will move downwardly toward the axle housing 16 toward its desired height relationship. When this occurs, the undamped valve assembly 168 will be returned to the position shown in FIG. 2. At this point, normal road movements of the vehicle will cause the valving element 170 to have the opposite ends 184 and 186 thereon continually moved against and from the open ends 154, 166 of the bleed lines 146, 148. As a result, equal amounts of air will bleed into the chambers 128, 132 to cause a pressure balance to be produced therein. This permits the spring 252 to position the actuator 94 and the spool valve 84 in the illustrated null or neutral position.

When the vehicle is loaded the leveling control will operate to initiate a full phase of operation. To accomplish this, the vehicle chassis is loaded to cause the primary springs to compress. This will cause the leveler units 18, 20 to retract. At this point the lever 174 will be moved by the outer surface of the shock absorber, namely the reservoir cylinder 26, to cause it to move outwardly or in a clockwise direction as viewed in FIG. 2. This will cause the end 186 of the valving element to close the open end 166 of the bleed conduit 146 and will concurrently space the end 184 of the valving element 170 from the open end 154 to the bleed conduit 148. As a result, air is bled through the conduit 148 into the chamber 128 while air is concurrently withdrawn from the chamber 132 through an exhaust path represented by the conduit 134, the vacuum orifice 144 and the conduit 142 to the engine intake manifold. As a result, a reverse pressure differential is produced across the diaphragm 116 as compared to the pressure differential which existed during the above-discussed exhaust phase of operation. This reverse pressure differential will cause the actuator arm 90 to move to the right as viewed in FIG. 1. It will cause end portion 88 to block flow to exhaust 231 and intermediate land portion 234 on the shuttle piston 84 to uncover the low flow passage 62 to communicate it with the bore 86. High pressure fluid will thence pass through a transverse bore 236 in and around the piston 84 where it will act on the ball check element 190 to raise it against the resistance of a spring 238 which establishes the relief point of the high pressure valve assembly 194 so the supply pressure is slightly above leveler chamber pressure before this inlet feed pressure is connected to the chamber. A perforated fixed abutment is located between and supports both springs 238 and 223.

When the element 190 lifts off its seat, high pressure fluid will flow through the internal bore 220 thence will flow across the unidirectional, annular valving element 216 into an annular space 240 between the tubular extension 202 and the tubular extension 210 of the minimum pressure retention valve assembly 208. The high pressure flow then passes through inclined passages 242, 244 to the fitting 44 which is connected to the conduit 46. The bore 240 is sealed with respect to the bore 212 by an O-ring 246 supported in the outer periphery of the fitting 44 at a point below a threaded head portion 248 thereon that is received by an internal threaded bore 250 on the upper end of the fitting 196 and at the low end by seal 214.

Thus, during the fill phase of operation high pressure hydraulic fluid is directed through the conduit 46 and the branch lines 50, 52 interiorly of the leveler units 18, 20. This oil accumulates in the reservoir spaces 40 to compress the gas in the space 38 to increase the pressure level within the pressure cylinder 34. It acts on the area of rod 28 to increase the lifting force from the leveler units 18, 20. The additional lifting force will raise the loaded vehicle back to a predetermined desired height relationship with the vehicle to restore the vehicle to a level phase of operation as described above.

During reciprocation of the spool valve 84 between its fill or up, exhaust or down and null or static positions, the end 88 of the shuttle piston 84 is spring biased by a spring member 252 located in a chamber 265 within housing extension 110. Each end of the spring 252 is in engagement with a spring locator member 258, 260. Each of the members 258, 260 has a small diameter portion of the actuator extending therethrough. During movement of the actuator member 90 in a direction toward the fill position (toward the right in FIG. 1) the rod shoulder moves member 258 so the spring 252 is compressed against member 260 seated on the housing. It will serve to quickly return the diaphragm 116 to its null position following a fill phase of operation. Like spring compression occurs as portion 88 on actuator member 90 moves in an opposite direction compressing the spring against fixed bearing member 92 during the exhaust phase. This will result in an opposite quick return to a neutral or null position following exhaust.

The actuator 94 and the fluid control circuit is arranged to assure that the height control valve 42 will be quickly positioned in the proper mode of operation following each leveling operation to correct for load change on the vehicle chassis.

The low minimum pressure retention valve 208 prevents all oil being dumped from the reservoir chambers 40 during the exhaust phase of operation. The minimum pressure, i.e., 200 psi, retention provided by the valve 208 is selected to maintain a level vehicle with two passengers in its front seat. One or both of these passengers can be removed from the vehicle, and without exhaust, the vehicle will be maintained level. When additional weight is added, the leveling system fill phase will occur in a manner to correct for subsequent level and pitch changes. In the illustrated arrangement, the leveler units 18, 20 use the leveling oil as a damping fluid for shock absorbing control. The additional oil charge provided by the minimum pressure retention valve 208 retains a given amount of oil in the reservoir space 40 which also provides for necessary rebound control across valving components of the type typically found in hydraulic shock absorbers.

The leveling system operation is delayed a period of from two to five seconds to prevent ordinary road movements from initiating either an exhaust or a fill control phase of operation during periods when the vehicle is leveled. In the illustrated arrangement this is accomplished by providing restrictions in the form of the vacuum bleed orifices 140, 144. The bleed down from one of the control chambers 128 or the other of the control chambers 132 is delayed by virtue of this restriction for the aforementioned time delay period to prevent undesirable or unnecessary vehicle leveling operation. This reduced restriction to the vacuum side of the fluid control system for the actuator 94 is also complemented by the undamped action of the valve assembly 168 which, as mentioned above, will continually move into and out of engagement with the open ends 154, 166 of the air bleed lines 146, 148 to evenly distribute bleed air into the chambers 128, 132 so as to maintain a balanced pressure condition therebetween. The vacuum reservoir 136 assures operation of vacuum actuator 94 when an exhaust phase occurs.

When the vehicle is overloaded, the leveling system will continually direct pressure into the leveler units until a maximum pressure, 1,100 psi is exceeded in the bore 86. Under these conditions the central hydraulic pressure source may be subjected to a high pressure mode for an undesirable period of time. Accordingly, a pressure control relief valve 270 in valve 84 is operative to provide an overload pressure blowoff capacity. Relief valve 270 has a valve element 275 having a large land 274 slidable in a bore in leveling control valve element 84. A ball seal element 272 is loosely mounted in a recess in the end of valve element 275 to permit relative lateral movement for seating on inlet port 233 and is retained so it does not fall out of the recess by staking or other suitable means such as a collar. The relief valve element 275 is biased by spring 278 seated on a perforated abutment 279 retained by a snap ring in the bore of spool valve 84. First, overload pressure in the low flow supply passage 62 — 236 acts on the small area of a ball seal element 272 exposed to port 233 to move valve element 276 in its bore to open the ball seal element to apply this pressure to the large area at land 274 of hollow piston valve element 276 to move it against the force of relief valve spring 278. When the valve 272, which closes the small area of port 233, has been unseated, the area against which the pressure acts is increased, extending to the outside diameter of land 274 of the piston. The low flow supply at overload pressure acting on valve 270 moves to throttle regulate flow from the low flow supply passages 62–236, through inlet port 233, the bore, port 280 and groove 102, to the normally lower pressure low flow supply passages 104, 64 and 98 at an intermediate pressure. The intermediate pressure, i.e., 170 psi, is just above the pressure normally required by the downstream subsystems, low load steering, i.e., to 70 psi and transmission, i.e., 100 psi. It is also less than minimum leveling pressure i.e., 200 psi. If the downstream pressure is higher due to high load steering, it acts on the large valve area at land 274 and holds valve element 275 open so the same higher pressure is in the high flow supply 64 and low flow supply 62. The low flow supply 62 is thus connected through the relief valve to supplement high flow supply 64 regardless of high flow supply pressure. The valve 270 resets when load is removed from the vehicle to cause control valve 84 to move to the null or exhaust position exhausting transverse passage 236 and directly connecting low flow supply 62 via groove 102 to high flow supply 104 — 64 so pressure on the area of land 274 is reduced to a point where the force of spring 278 overcomes the pressure force regardless of the high flow supply pressure.

The opening movement of valve element 275 is limited by abutment 279 at an orifice opening slightly larger than that required for throttling to regulate the low flow supply and sufficiently large for flow when both the low and high flow supply have the same pressure, but smaller than inlet port 233, so exhaust of passage 236 resets or closes the relief valve 275.

A bleed to transmission sump is provided by a housing bore 282 to return leakage into chamber 256 to the transmission sump. At the opposite end to valve 84 a bore 284 serves the same purpose.

The central hydraulic system pump provides sufficient flow, i.e., 3 gpm, and up to a necessary maximum pressure, i.e., 1,350 psi, to provide essential flow and pressure for proper operation of all subsystems. This flow is directly connected in series to the brake, which in the brake off mode transmits the full flow, i.e., 3 gpm, with a small non-functional pressure drop, i.e., 15 psi, and in the normal brake apply mode a variable restriction providing a brake apply pressure and a pressure drop up to a moderate amount, i.e., 200 psi, and the same in flow. Though theoretically a change in restriction will cause a change in flow rate in the brake and steering subsystems during a pressure change, the fluid volume requirements of these subsystems are so small and these changes occur so quickly that there is no significant change in flow rate. During steady state operation, full flow will be transmitted. Abnormally high brake apply pressure will reduce the pressure available for downstream subsystems, but leveling and high load steering will now occur at the same time and maximum providable brake pressure leaves sufficient pressure for the transmission.

The brake outlet flow is connected by passage 58 to the divider valve 60 and divided into low flow supply passage 62, i.e., 10 percent of 3 gpm, used to meet leveling subsystem requirements and high flow supply in passage 64, i.e., 90 percent of 3 gpm, to meet the downstream steering and transmission subsystem requirements.

The divider valve maintains this predetermined division of flow regardless of pressure in the inlet, low flow and high flow passages as there is continuous flow from the inlet to the low and high flow passages. The inlet passage has the same pressure as the higher pressure in the low flow passage or the high flow passage plus the pressure drop which operates the flow valve.

When the leveling subsystem and its control valve 84 are in the above described null or exhaust positions, the leveling subsystem has no fluid requirements, and control valve 84 connects low flow supply 62 via its groove 102 to high flow supply 64 — 104 — 98 to provide full pump flow to the downstream subsystems at the sum of the pressures they require. When the vehicle load is being increased, the leveling subsystem and its control valve 84 in the fill mode has automatic leveling flow requirements in a high pressure range 200 to 1,100 psi increasing with load. The automatic leveling control valve 84 closes the connection between the low and high flow supplies and connects the low flow supply only to the leveling subsystem to quickly provide the proper level and returns to the null mode. During the leveling fill mode, the high flow supply 64 supplies the downstream subsystems, steering and transmission with 90 percent of full flow and at a pressure up to the pressure available from the brake, up to maximum pump pressure less the pressure being used in the brake. During operation of the leveling system in the fill mode, an overload pressure, over 1,100 psi of low flow supply on a small area of ball 272 unseats the ball so this pressure acts on the large area of valve element 275 at land 274 to regulate low supply pressure at an intermediate value, i.e., just above 170 psi, above normal downstream pressure requirements and throttle flow from the low flow supply to the high flow supply when its pressure is normal, i.e., 150 – 170 psi. Higher downstream pressure will act on the large area of the relief valve 275 to hold it open so low flow supply is connected without throttling to high flow supply and both have the same pressure. On removal of load, leveling valve 275 moves to the null position exhausting passage 236 and, regardless of high flow supply pressure, the relief valve resets.

The steering subsystem normally requires a low pressure, i.e., 50 – 70 psi and the transmission a moderate pressure, i.e., 100 psi. As a moderate back pressure, i.e., 170 psi, does not interfere with brake operation and with a normal brake pressure, i.e., 200 psi, the sum is within the source capacity for normal and severe operation of steering and leveling operation. The steering subsystem restriction is limited so minimum flow requirements of the transmission are always met. If maximum pressure occurs with the steering gear and brake at maximum it will be relieved at the pump but such condition is not a useful driving mode. During normal steady state operation of the system, full flow is transmitted to the transmission. Thus the system provides the maximum simultaneously usable brake pressure and steering pressure. The steering pressure may also be used for leveling without diminishing steering pressure. Since in commercial units maximum steer pressure is slightly higher than leveling unit overload pressure, maximum steering pressure produced by the operator powering the steering gear against its limit stop, occuring after overload and before resetting, will slightly further increase vehicle level of an overload vehicle. Such arrangement could be used deliberately by an operator in an emergency to temporarily use an overloaded vehicle. Also, these pressures can be the same to avoid this effect. The pump is only loaded to the degree necessary to supply the subsystem pressure requirements with a pressure equal to the brake pressure and the higher pressure downstream of the divider valve which may be the pressure supplied to the leveling unit or the sum of the steering and transmission pressure.

Modification

Figure 3:
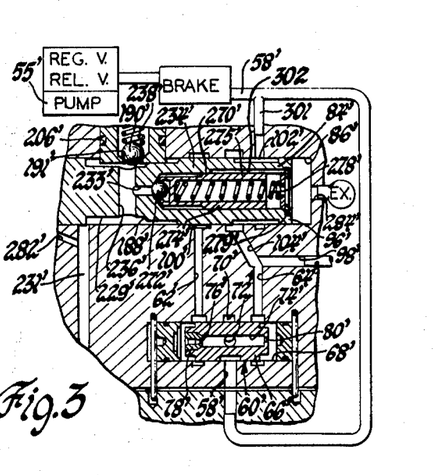
FIG. 3 is a partial diagrammatic view of a modified central hydraulic system.

The modified central hydraulic system shown in FIG. 3 is similar to the system shown in FIGS. 1 and 2. The partial FIG. 3 shows the modified portions. The same reference numbers primed have been applied to the like parts described above and the changes are described below with additional reference numbers. As in FIG. 1 the pump 55' and brake are connected in series to inlet passage 58' to the divider valve 60. In addition the inlet passage 58' has a branch 301 connected to bore 86' of leveling control valve 84' which has the groove 102 positioned to connect branch 301 to the low flow supply passage 104 — 64 bypassing the divider valve for full flow to the downstream subassemblies, as in FIG. 1, the steering gear and transmission. The relief valve 275' is like the relief valve 275, but instead of the ports 280 in the valve element 84, there is provided a plurality, preferably three axial grooves, one such groove 302 being shown, in the bore of leveling valve element 84' in which relief valve elements 275' slides. Thus when overload pressure after acting on the small area of ball 272' acts on the large area of land 274' the low flow passage 62' — 236' is vented to exhaust via bore 86' and exhaust 284' to sump.

This arrangement modifies the operation by providing during null and exhaust mode of the automatic leveling subsystem, a connection for full pump flow through the leveling control valve in bypass relation to the divider valve to the downstream subsystems, the steering and transmission. During this phase of operation the divider valve is nonfunctional and its pressure drop is eliminated. During the fill mode of operation flow is directed through the divider valve to the low flow and high flow passages as in FIG. 1. On overload the low flow supply is exhausted to sump. Otherwise this modification functions basically like FIG. 1.

In the above description of this central hydraulic system the word "passage" has been used to define several means for conducting fluid between portions of the system, but it will be appreciated that "line" is an equivalent term and that both may be used interchangeably or where selective reference is desired.

While the embodiments of the present invention, as herein disclosed, constitute a preferred form it is to be understood that other forms might be adopted.

It is claimed:

1. In a central hydraulic system; a sump; source means connected to said sump providing a full flow fluid supply; a first vehicle control actuator means connected to said source to receive, variably restrict and transmit said full flow and provide a variable apply pressure; a second vehicle control actuator means operative to receive, variably restrict and transmit fluid flow and provide a variable apply pressure varying substantially inversely relative to the apply pressure of said first actuator control means during the operation of a vehicle; a vehicle condition changing actuator means operative on receiving a small volume of fluid to provide a normal actuator pressure to actuate the condition changing actuator means and control valve means operatively connected to said first actuator means, said second actuator means and said condition changing actuator means operative to receive full flow from said first actuator means and in one condition supply a low flow to said condition changing actuator means to provide said actuator pressure and a high flow to said second actuator means and in another condition block flow to said condition changing actuator means and connect full flow to said second actuator means.

2. The invention defined in claim 1 and said first actuator means being a hydraulic power brake having open center type control means; said second actuator means being a hydraulic power steering gear having open center type controls and said condition changing means being a vehicle leveling subsystem having closed center type controls.

3. The invention defined in claim 1 and said control valve means including relief valve means operative in said one position of said control valve means in response to an overload actuator pressure in excess of said normal actuator pressure to relieve said actuator pressure of said low flow supply to a low pressure substantially below said normal actuator pressure; retainer valve means to retain said normal actuator pressure in said condition changing actuator means to continue normal operation and said control valve means on removing said overload moving to said other position and said relief valve closing.

4. The invention defined in claim 3 and said relief valve means relieving said low flow supply to said high flow supply.

5. In a central hydraulic system; a sump; a pump connected to said sump providing a full flow fluid supply at a pressure to meet system requirements up to a maximum value; first vehicle control actuator means connected to said pump to receive full flow, having a first outlet passage and operator variable restriction means to provide a variable apply pressure to actuate the first actuator means and to transmit full flow to said outlet passage; second vehicle control actuator means having a supply line, outlet line and operator variable restriction means restricting flow from said supply line to said outlet line to provide a variable apply pressure to actuate the second actuator means; flow divider means having a low flow passage, a high flow line, an inlet connected to said first outlet passage to receive full flow and dividing full flow to provide a predetermined low flow in said low flow passage and a predetermined high flow in said high flow line throughout the range of operating pressures; said high flow line being connected to said supply line; a third vehicle control actuator means having a variable load and actuated by fluid under pressure varying with the variable load and having control valve means operative in a full position to connect said low flow passage with a pressure increasing with load to said third actuator means to actuate said third actuator and operative in null and exhaust positions to block said low flow passage connection to said third actuator means and to connect one of said passages to said high flow line to provide full flow in said high flow line.

6. The invention defined in claim 5 and said control valve means in said null and exhaust positions connecting said low flow passage to said high flow line.

7. The invention defined in claim 5 and said control valve means in said null and exhaust positions connecting said first outlet passage to said high flow line disabling said divider valve means.

8. The invention defined in claim 5 and said control valve means having relief valve means operative when said control valve means is in said fill position in response to overload pressure in said low flow passage connected to said third actuator means actuating on overload to open and relieve pressure to a low value to unload the pump.

9. The invention defined in claim 8 and said relief valve means relieving pressure from the low flow passage to the high flow line.

10. The invention defined in claim 8 and said relief valve means relieving pressure from the low flow passage directly to said sump.

11. The invention defined in claim 8 and said control valve means in the fill position supplying a wide range of high pressures up to overload pressure to actuate a wide range of loads up to overload and said relief valve means on opening throttling and regulating the pressure in said low flow passage at a low value less wide range of high pressures.

12. In a central hydraulic system; a sump; source means having a first supply passage and a second supply passage providing in said first supply passage a low flow and in said second supply passage a high flow at varying pressures up to a maximum pressure; a first actuator subsystem requiring low flow and a range of high pressure varying with load during normal load operation and higher pressure during overload; first control valve means connected to said first subsystem and said first and second supply passages and operative in a null position to block flow from said first supply passage to said first subsystem to retain fluid during normal load operation, an exhaust position to connect said first subsystem to sump for reduced load operation, and a fill position to connect said first supply passage to said first subsystem to provide pressure for normal load operation and further operative in said null and exhaust positions to control said source to provide full flow, the sum of low flow and high flow in said second supply passage; a second actuator subsystem having high flow and low pressure requirements during low load operation and on restricting flow increasing pressure up to maximum pressure requirements during higher load operation connected to said second supply passage, relief valve means operatively connected to said first supply passage to relieve overload pressure in said first supply passage, and operative in a closed position to prevent exhaust from said first supply passage in response to said higher overload pressure in said first supply passage to open and move to a regulating position to regulate the pressure in said connecting first passage at a pressure value less than said range of high pressures.

13. In a central hydraulic system, a sump; source means connected to said sump having a full flow supply passage, a low flow supply passage and a high supply passage providing respectively full flow, low flow and high flow; a first actuator subsystem having high pressure and low flow requirements during normal operation and higher pressure requirements during overload; first control valve means connected to said first subsystem and and at least two of said source passages and operative in a null position to block flow to and from said first subsystem and to connect said source passage for full flow to said high flow supply passage, an exhaust position to connect said source full flow to said high flow supply passage and to connect said first subsystem to sump and a fill position to connect said low flow supply passage to said first subsystem; a second actuator subsystem having high flow and low pressure requirements during low load operation and up to maximum pressure requirements during higher load operation connected to said high flow supply passage, relief valve means operatively connected to said first supply passage to relieve the pressure in response to said higher pressure in said low flow supply passage to open and move to a regulating position to regulate the pressure in said low flow supply passage at an intermediate value.

14. In a central hydraulic system; a sump; source means connected to said sump and providing full fluid flow; power brake means connected to said source providing power brake pressure and transmitting full flow in a full flow passage; divider valve means connected to said brake full flow passage receiving said full flow from said brake means, having a low flow supply passage and a high flow supply passage and providing low flow in said low flow supply passage and high flow in said high flow supply passage; a leveling subsystem having high pressure and low flow requirements during normal operation and higher pressure requirements during overload; leveling control valve means connected to said leveling subsystem and at least two of said flow supply passages and operative in a null position to block flow to and from said leveling subsystem and to connect said passages for full flow to said high flow supply passage, an exhaust position to connect said passages for full flow to said high flow supply passage and to connect said leveling subsystem to sump and a fill position to connect said low flow supply passage to said leveling subsystem; a steering actuator subsystem having high flow and low pressure requirements during low load operation and up to maximum pressure requirements during higher load operation connected to said high flow supply passage, relief valve means operatively connected to said low flow supply passage to relieve the pressure in response to said higher pressure in said low flow supply passage to open and move to a regulating position to regulate the pressure in said low flow supply passage at an intermediate value.

15. In a central hydraulic system; a sump; source means connected to said sump and having a first supply passage and a second supply passage providing in said first supply passage a low flow and in said second supply passage a high flow at varying pressures up to a maximum pressure; a first actuator subsystem having high pressure and low flow requirements during normal operation and higher pressure requirements during overload; first control valve means connected to said first subsystem and said first and second supply passages and operative in a null position to block flow to and said first subsystem, to connect said first supply passage to said second supply passage, an exhaust position to connect said first supply passage to said second supply passage and to connect said first subsystem to sump and a fill position to connect said first supply passage to said first subsystem; a second actuator subsystem having high flow and low pressure requirements during low load operation and up to maximum pressure requirements during higher load operation connected to said second supply passage, relief valve means operatively connected between said first supply passage to said second supply passage, and operative in a closed position to prevent flow between said first supply passage and said second supply passage, in response to said higher pressure in said first supply passage to open and move to a regulating position to regulate the pressure in said first supply passage at an intermediate value and to connect the excess fluid to said second supply passage and being responsive to a pressure above said intermediate pressure in said second supply passage to provide an unregulated connection between said first and second supply passages and responsive to pressure in said second supply passage below said intermediate pressure to close.

16. In a central hydraulic system; a sump; source means having a first supply passage and a second supply passage providing in said first supply passage to a low flow and in said second supply passage to a high flow at varying pressures up to a maximum pressure; a first actuator subsystem having first motor means having high pressure and low flow requirements during a first operating condition and occasionally having higher pressure requirements during a second operating condition and having a first control valve means connected to said first motor means and said first and second supply passages and having a movable valve element means having a connecting first actuator passage and a connecting second actuator passage and operative with said movable valve element in a null position to block flow to and from said first actuator motor, to connect said connecting first passage to said sump and to connect said first supply passage through said connecting second passage to said second supply passage, an exhaust position to connect said first supply passage through said connecting second passage to said second supply passage and to connect said first motor means through said connecting first passage to sump and a fill position to connect said first supply passage through said connecting first passage to said first motor means and to connect said second supply passage to said connecting second passage; a second actuator subsystem having high flow and low pressure requirements during low load operation and reduced flow and up to maximum pressure requirements during higher load operation connected to said second supply passage; relief valve means having a relief passage operatively connected to said connecting first passage and said connecting second passage, biasing means and relief valve element means having a small unbalanced area and a large unbalanced area being biased by said biasing means to a closed position preventing any flow in said relief passage and being biased by fluid pressure in said connecting first passage acting on said areas in the opposite direction to a regulating position and to an open position and operative in said closed position in response to said higher pressure in said connecting first passage acting on said small area to move to regulating position to connect said pressure in said connecting first passage to act on said large area to regulate the pressure in said connecting first passage at an intermediate value and to connect the excess fluid to said connecting second passage and said second supply passage and being responsive to a pressure above said intermediate pressure in said second supply passage to move to open position and responsive to pressure in both second supply passage and said first connecting passage below said intermediate pressure to close.

17. In a central hydraulic system; a sump; source means having a first supply passage and a second supply passage providing in said first supply passage a low flow and in said second supply passage a high flow at varying pressures up to a maximum pressure; a first actuator subsystem having first motor means having high pressure and low flow requirements during a first operating condition and occasionally having higher pressure requirements during a second operating condition and having a first control valve means connected to said first motor means and said first and second supply passages and having a movable valve element means having a connecting first actuator passage and a connecting second actuator passage and operative with said movable valve element in a null position to block flow to and from said first actuator motor, to connect said connecting first passage to said sump and to connect said first supply passage through said connecting second passage to said second supply passage, an exhaust position to connect said first supply passage through said connecting second passage to said second supply passage and to connect said first motor means through said connecting first passage to sump and a fill position to connect said first supply passage through said connecting first passage to said first motor means and to connect said second supply passage to said connecting second passage; a second actuator subsystem having second motor means having high flow and low pressure requirements during static condition operation and reduced flow and up to maximum pressure requirements during condition changing operation and a second control valve means connected to said second supply passage, said second motor means and said sump operative in a static condition position to maintain said low pressure in said motor means and transmit said high flow to said sump and operative in a condition changing position to restrict flow to said sump and increase pressure supplied to said motor to said maximum value; relief valve means having a relief passage operatively connected to said connecting first passage and said connecting second passage, biasing means and relief valve element means having a small unbalanced area being biased by said biasing means to a closed position preventing any flow in said relief passage and being biased by fluid pressure in said connecting first passage acting on said areas in the opposite direction to a regulating position and to an open position and operative in said closed position in response to said higher pressure in said connecting first passage acting on said small area to move to regulating position to connect said pressure in said connecting first passage to act on said large area to regulate the pressure in said connecting first passage at an intermediate value and to connect the excess fluid to said connecting second passage and said second supply passage and being responsive to a pressure above said intermediate pressure in said second supply passage to move to open position and responsive to pressure in both said second supply passage and said first connecting passage below said intermediate pressure to close.

18. In a central hydraulic system; a sump; source means providing fluid from said sump having a substantially constant limited flow and regulated pressure limited to a maximum pressure and returning overage to sump; a first supply passage; a second supply passage; flow divider valve means connected to said source means and said first and second supply passages and dividing flow to limit flow to said first supply passage to a low flow and to limit flow to said second supply passage to a high flow; a first actuator subsystem having first motor means having high pressure and low flow requirements during a first operating condition and occasionally having higher pressure requirements during a second operating condition and having a first control valve means connected to said first motor means and said first and second supply passages and having a movable valve element means having a connecting first actuator passage and a connecting second actuator passage and operative with said movable valve element in a null position to block flow to and from said first actuator motor, to connect said connecting first passage to said sump and to connect said first supply passage through said connecting second passage to said second supply passage, an exhaust position to connect said first supply passage through said connecting second passage to said second supply passage and to connect said first motor means through said connecting first passage to sump and a fill position to connect said first supply passage through said connecting first passage to said first motor means and to connect said second supply passage to said connecting second passage; a second actuator subsystem having second motor means having high flow and low pressure requirements during static condition operation and reduced flow and up to maximum pressure requirements during condition changing operation and a second control valve means connected to said second supply passage, said second motor means and said sump operative in a static condition position to maintain said low pressure in said motor means and transmit said high flow to said sump and operative in a condition changing position to restrict flow to said sump and increase pressure supplied to said motor to said maximum value; relief valve means having a relief passage operatively connected to said connecting first passage and said connecting second passage, biasing means and relief valve element means having a small unbalanced area and a large unbalanced area being biased by said biasing means to a closed position preventing any flow in said relief passage and being biased by fluid pressure in said connecting first passage acting on said areas in the opposite direction to a regulating position and to an open position and operative in said closed position in response to said higher pressure in said connecting first passage acting on said small area to move to regulating position to connect said pressure in said connecting first passage to act on said large area to regulate the pressure in said connecting first passage at an intermediate value and to connect the excess fluid to said connecting second passage and said second supply passage and being responsive to a pressure above said intermediate pressure in said second supply passage to move to open position and responsive to pressure in both said second supply passage and said first connecting passage below said intermediate pressure to close.

* * * * *

PO-1050
(5/69)

UNITED STATES PATENT OFFICE
CERTIFICATE OF CORRECTION

Patent No. 3,853,198         Dated   December 10, 1974

Inventor(s) Harold E. Boettger et al

It is certified that error appears in the above-identified patent and that said Letters Patent are hereby corrected as shown below:

IN THE SPECIFICATION:

Column 3, line 29, after "flow" insert -- rate --; Column 8, line 66, "full" should be -- fill --; Column 9, line 62, numeral "265" should be -- 256 --; Column 10, line 16, after "low" insert -- or --; Column 12, line 3, "now" should be -- not --; Column 12, line 8, before "passage" insert -- in --;

IN THE CLAIMS:

Column 15, line 2, "full" should be -- fill --; Column 16, line 3, after "high" insert -- flow --.

Signed and sealed this 29th day of April 1975.

(SEAL)
Attest:

RUTH C. MASON
Attesting Officer

C. MARSHALL DANN
Commissioner of Patents
and Trademarks